United States Patent
Seiler (10) Patent No.: US 9,858,198 B2
(45) Date of Patent: Jan. 2, 2018

(54) 64KB PAGE SYSTEM THAT SUPPORTS 4KB PAGE OPERATIONS

(71) Applicant: Intel Corporation, Santa Clara, CA (US)

(72) Inventor: Larry Seiler, Boylston, MA (US)

(73) Assignee: Intel Corporation, Santa Clara, CA (US)

( * ) Notice: Subject to any disclaimer, the term of this patent is extended or adjusted under 35 U.S.C. 154(b) by 220 days.

(21) Appl. No.: 14/751,843

(22) Filed: Jun. 26, 2015

(65) Prior Publication Data

US 2016/0378683 A1 Dec. 29, 2016

(51) Int. Cl.
*G06F 12/10* (2016.01)
*G06F 12/1009* (2016.01)

(52) U.S. Cl.
CPC .... *G06F 12/1009* (2013.01); *G06F 2212/657* (2013.01)

(58) Field of Classification Search
CPC .......................... G06F 12/1027; G06F 12/1009
See application file for complete search history.

(56) References Cited

U.S. PATENT DOCUMENTS

| | | | |
|---|---|---|---|
| 5,321,836 A | 6/1994 | Crawford et al. | |
| 7,313,669 B2 | 12/2007 | Neiger et al. | |
| 8,719,547 B2 | 5/2014 | Chinya et al. | |
| 2012/0110236 A1* | 5/2012 | Ali | G06F 12/1009 711/6 |
| 2012/0239871 A1 | 9/2012 | Badam et al. | |
| 2013/0024648 A1* | 1/2013 | Chen | G06F 12/1027 711/207 |
| 2013/0166834 A1* | 6/2013 | Mayhew | G06F 12/10 711/105 |
| 2014/0181460 A1* | 6/2014 | Hsu | G06F 12/1027 711/207 |

OTHER PUBLICATIONS

Paul Krzyzanowski, "Memory Management: Paging", Oct. 20, 2010, pp. 1-14.
U.S. Appl. No. 14/528,076, filed Oct. 30, 2014, entitled "Dynamically Controlling Power Management of an On-Die Memory of a Processor ," by Eli Kupermann, et al.

* cited by examiner

*Primary Examiner* — Edward Dudek, Jr.
(74) *Attorney, Agent, or Firm* — Trop, Pruner & Hu, P.C.

(57) ABSTRACT

In an embodiment, a processor includes logic to provide a first virtual address of first data stored in a memory at a first physical address. The memory includes pages of a memory allocation unit page size. The processor also includes translation logic to access the first data via a first virtual to physical address translation that includes a first hierarchy of page translation tables to map to a first page having a first page size that is smaller than the memory allocation unit size. Other embodiments are described and claimed.

18 Claims, 9 Drawing Sheets

64KB PAGE SYSTEM THAT SUPPORTS 4KB PAGE OPERATIONS

TECHNICAL FIELD

Embodiments pertain to paging systems.

BACKGROUND

A general problem of paging systems that convert virtual addresses to physical addresses involves a size of pages on a free memory list. Typically a paging system that supports allocation of memory in 64 KB pages does not support a 4 KB page size. In order to be backwards compatible with some currently operating systems and applications, a 4 KB page size needs to be supported. Typically, support of the 4 KB page size is accomplished by allocation of memory in 4 KB units. Pages of size 64 KB may be assembled from 4 KB units by one of several methods. Support of a 4 KB page size by a paging system that supports the 64 KB size in this manner may result in serious inefficiencies in lookup when in the 64 KB page size lookup mode. Typically a whole process or segment must use the same page size, so if a legacy application requests protections or addresses that are aligned on a 4 KB boundary, all of the pages are to be stored as 4 KB pages.

DETAILED DESCRIPTION

In addition to backwards compatibility, a related issue involves memory caches, which typically match high order address bits against a tag stored with each memory value and use low order address bits to directly index into the cache memory. With a 4 KB page size, only the lower 12 address bits are unchanged by address translation, which can add complexity to implementation of a direct mapped cache to index the memory location. Use of 64 KB pages is conducive to design of larger memory caches.

Another general problem of paging systems is that the operating system needs to manage the mapping of individual pages of physical memory into various virtual memory spaces, which can require tracking information about the individual pages. A larger page size can result in a reduction of page management that the operating system performs and can also result in reduction of tracking information to be stored. However, backward compatibility is of major importance for many operating systems.

Embodiments provide an efficient scheme for an operating system to support allocation of memory in units of 64 KB, while fully supporting applications that operate with a 4 KB page size. Note that these sizes are illustrative, and that more generally the embodiments presented herein permit an operating system to support operating on pages smaller than the memory allocation unit used in a free memory list. Embodiments presented herein also permit mapping of larger address spaces than current paging systems without an increase in the number of page walks required. Additionally, embodiments provide means to self-map page tables into virtual address space.

In embodiments, a new paging system ("VA64") includes the following features:

1) VA64 increases a page table entry (PTE) size from 64-bits to 128-bits, which provides space to support a larger physical address (PA) range.
2) VA64 changes a memory allocation unit size from 4 KB to 64 KB, which allows 4K page table entries (PTEs), each PTE with size 128-bits.
3) VA64 provides a 4-level lookup that supports a 64-bit virtual address (VA) range and that can map virtual pages to a 64-bit physical address (PA) range.
4) VA64 supports a 5-level lookup that allows mapping a 64 KB page into 4 KB sub-pages, each of which has its own separate page table entry.
5) VA64 supports legacy 2 GB and 1 TB large page sizes as well as supporting native 256 GB and 1 TB large pages, and even native 4 PB pages if desired.
6) VA64 allows optimization of client and low end systems by reduction in page table walks that result in in 52-bit and 40-bit virtual address ranges.

As a result of support of the mapping of the 64 KB page into 4 KB subpages, VA64 directly supports all currently defined operations on 4 KB pages, including independent protection bits per 4 KB page and arbitrary 4 KB-aligned address mappings. VA64 also supports OS kernel page management on 4 KB boundaries, even when the OS kernel allocates memory in 64 KB units. As a result of support of large pages, VA64 supports all divisions of the virtual address range into pages that an existing paging system such as Intel Corporation's IA-32e paging system supports. Therefore, VA64 supports applications and hardware devices that work with a 4 KB-page Windows® OS kernel, while also taking full advantage of 64 KB pages when 64 KB pages can be used.

The capabilities of VA64 can be adopted gradually by the OS kernel, rather than requiring them all to be supported in the first generation VA64-capable OS kernel. For example, a VA64-capable OS kernel could start by mapping all pages to current sizes (e.g., 4 KB/2 GB/1 TB in Intel Corporation's IA-32e paging system), but changing to a new page table format. After the change in page table format, the OS kernel could be modified to map virtual memory in 64 KB units and change to store 64 KB pages in its free list. Then the OS kernel could start using 64 KB pages whenever alignment and protections permit, and add support for other VA64 capabilities.

Finally, OS kernel variants could be defined to support 64-bit, 52-bit and 40-bit VA ranges for server, client, and low end systems. These address range choices could be supported using compile-time constants with a common code base. Alternately, hardware could be provided that allows the reduced number of page walks permitted by the reduced address ranges, while using a single executable version of the OS kernel.

In VA64, the memory allocation unit is 64 KB instead of a typical size of 4 KB. As a result, each page table is 64 KB, and therefore stores 4K 128-bit PTEs. Consequently, a four-level lookup maps a 12+12+12+12+16=64-bit virtual address space.

Figure 1:
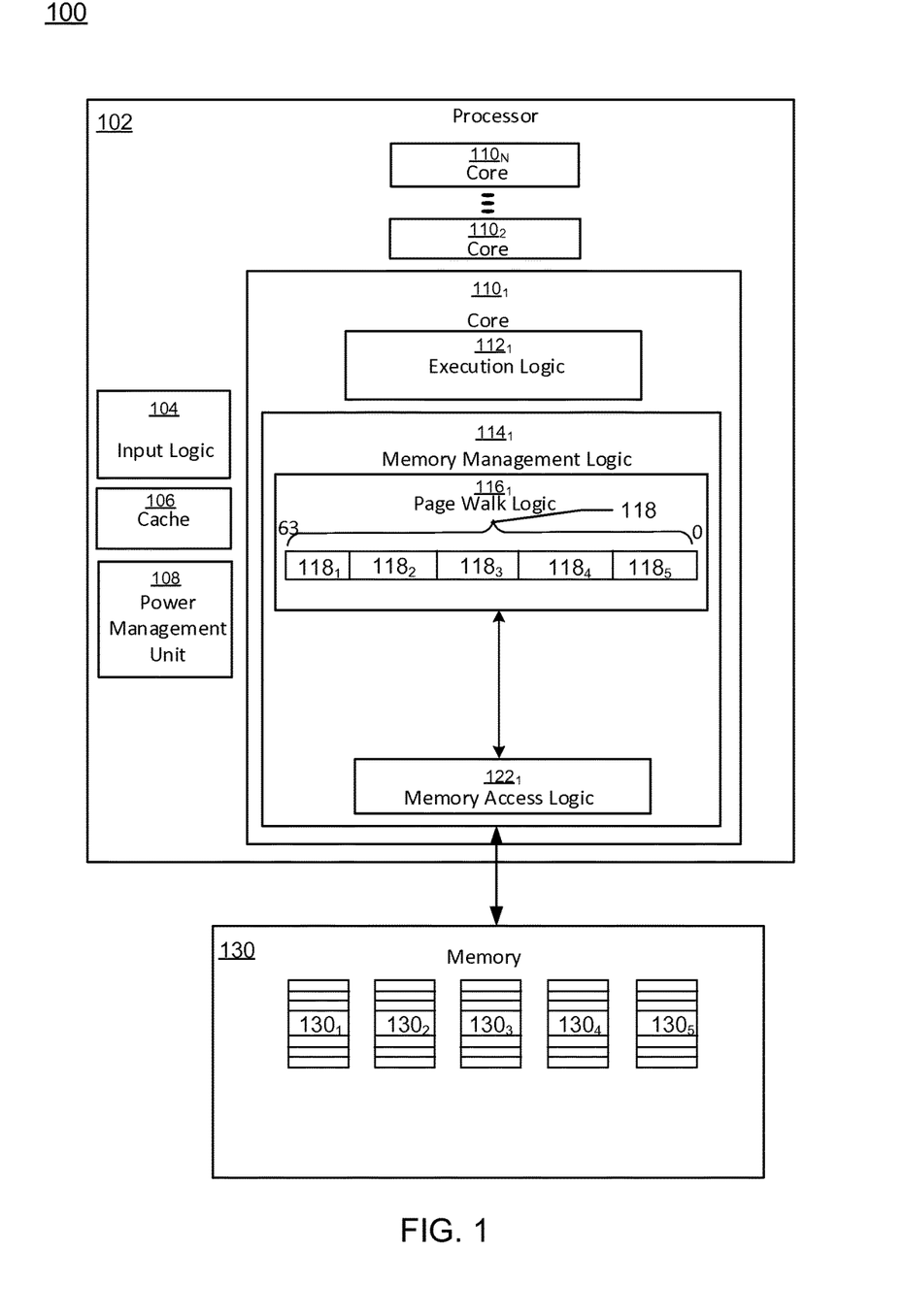
FIG. 1 is a block diagram of a system, according to an embodiment of the present invention.

FIG. 1 is block diagram of a system, according to embodiments of the present invention. System 100 includes a processor 102 and a memory 130, e.g., random access memory (RAM) such as dynamic random access memory (DRAM), static random access memory (SRAM), synchronous DRAM (SDRAM), and/or other types of memory.

The processor 102 includes input logic 104, cache memory 106, power management unit 108, cores $110_1$-$110_N$, and may include other components such as other logics, additional cache memories, etc. Core $110_1$ includes execution logic $112_1$, memory access logic $122_1$, and memory management logic $114_1$ that may include page walk logic $116_1$.

In operation, responsive to a request to access stored data (e.g., as a result of an executed instruction input via the input logic 104 and executed by the execution logic $112_1$) having a 64-bit virtual address 118, the page walk logic $116_1$ determines the page size and the physical address of the page, which may be accomplished by accessing each level of a page walk (also "walk" herein) until dedicated bits in a page table entry indicate that the page walk is complete. In an embodiment, a 4-level walk produces a 64 KB page address and a 5-level walk produces a 4 KB page address. For a 64 KB page, 16-bits of the virtual address are used as a physical offset within the page. For a 4 KB page address, 12-bits of the virtual address are used as a physical offset within the page. Other page sizes may be supported by using dedicated bits in the page table entry, as described below.

For each level of the page walk, an entry (e.g., a 128-bit entry) is selected and the selected entry is accessed in the memory 130. The selected entry includes a physical address of the next level page table or page for access by the page walk logic $116_1$. For example, in a 4-level page table walk, each of three successive levels uses a corresponding portion $118_1$ $118_2$ $118_3$ of the virtual address 118 to select a page table entry that includes the physical address of a next level table. Virtual address portion $118_1$ determines an entry selection from table $130_1$, and the selection from table $130_1$ includes the physical address of the table $130_2$. Virtual address portion $118_2$ determines selection of an entry from table $130_2$ that includes the physical address of table $130_3$ to be accessed in the memory 130 via the memory access logic $122_1$. Virtual address portion $118_3$ determines the selection of an entry from table $130_3$. The entry selected from table $130_3$ identifies a physical address of a table $130_4$, and each entry of $130_4$ corresponds to a distinct data page (e.g., 64 KB page). Virtual address portion $118_4$ determines the selection of an entry from table $130_4$. The entry selected from table $130_4$ identifies a physical address of a page $130_5$ (e.g., 64 KB). A byte offset virtual address portion $118_5$ is used to select the physical address of the requested data within page $130_5$. At each level of the walk, the resultant physical address selected is provided to the memory address logic $122_1$ in order to access the requested data within the memory 130.

Figure 2:
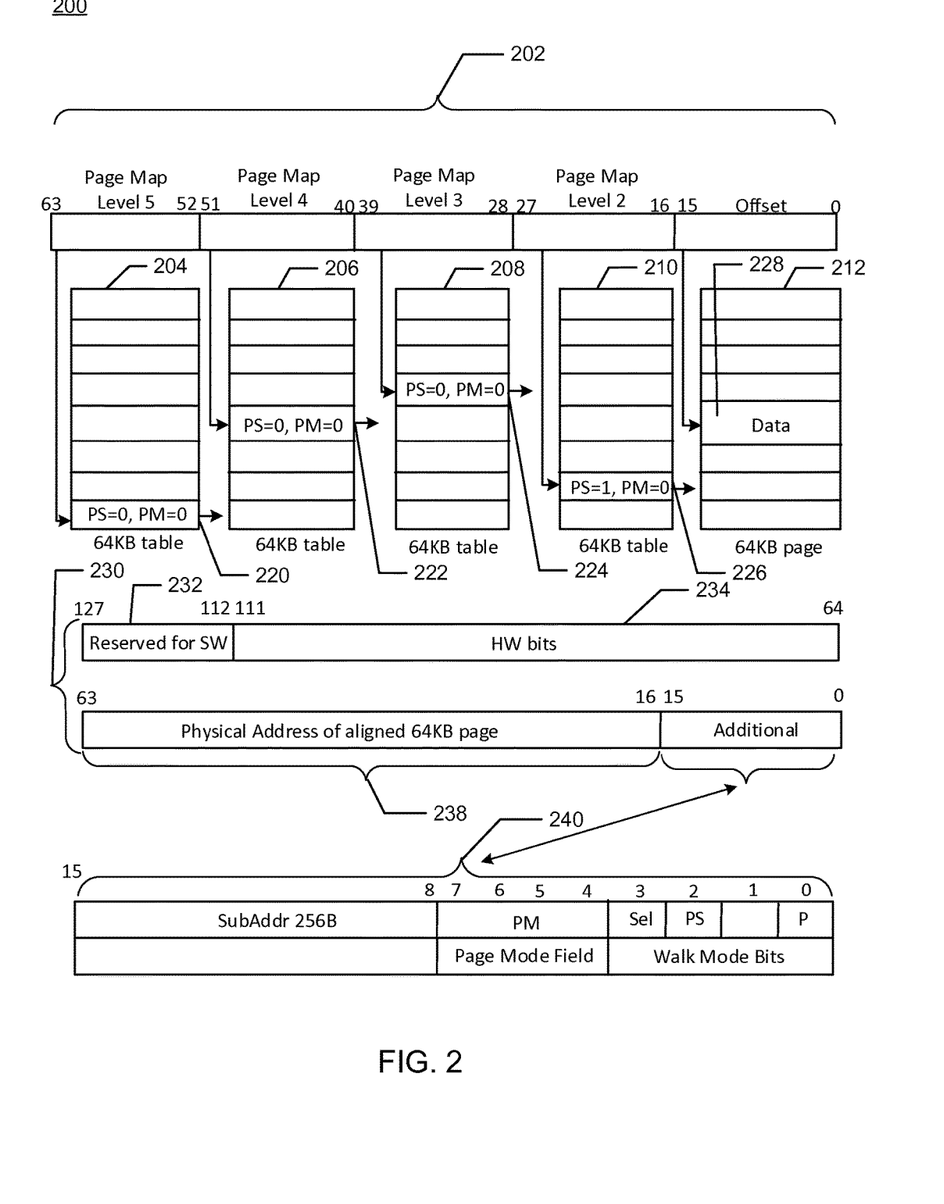
FIG. 2 depicts a multi-level page walk, according to an embodiment of the present invention.

FIG. 2 depicts a multi-level page table walk, according to an embodiment of the present invention. Page table walk 200 illustrates a four-level page walk of a 64 KB page. Page table walk 200 is based on a 64-bit virtual address 202 and a set of 64 KB page tables/pages 204-212. Each page table entry is illustrated in an example page table 230 and is to have 128 bits, and includes reserved software SW bits 232 (127:112); hardware (HW) control bits 234 (111:64); physical address portion 238 (63:16); and additional bits 240 (15:0) that include subaddress bits (15:8), page mode field (PM) (7:4), and walk mode bits (3:0). The SubAddr and PM fields are zero for this 64 KB page walk. The P and PS bits are used in existing paging systems such as Intel Architecture IA-32e, where P indicates whether the referenced page is "present," that is, mapped to physical memory, and PS controls the page walk, as described later. These examples assume that P has been set to 1 by the operating system, so that the page is present in all cases. The Sel bit is described later and can be ignored for this example.

The four level page table walk 200 begins by selection of a page table entry 220 within an initial level page table 204, the selection determined by contents of bits 63:52 of the virtual address bits. The initial level is also referred to as "page map level 5" and the table address is contained in a system register. Page entry 220 includes physical address bits that correspond to a 64 KB page of memory. Indicator PS=0 indicates that the physical address points to page table 206, e.g., the page walk is to continue.

A next level of the page walk ("Page Map Level 4") selects entry 222 in page table 206, where selection is determined by bits (51:40) of the virtual address 202. PS=0 for entry 222, and therefore the page walk is to continue. Entry 222 includes a physical address of the page table 208.

A third level of the page walk ("Page Map Level 3") selects, from page table 208, page table entry 224 based on bits (39:28) of the virtual address 202. Page table entry 224 includes physical address bits that correspond to page table 210. Indicator PS=0 in entry 224, and therefore the page walk is to continue.

A fourth level of the page walk ("Page Map Level 2") selects page table entry 226 from page table 210 based on bits (27:16) of the virtual address 202. Indicator PS=1 in entry 226 indicates that the page walk is to stop at the fourth level. The entry 226 includes a physical address of a page of physical data stored in memory. Bits (15:0) provide an offset within page 212 to the desired physical memory address.

Figure 3:
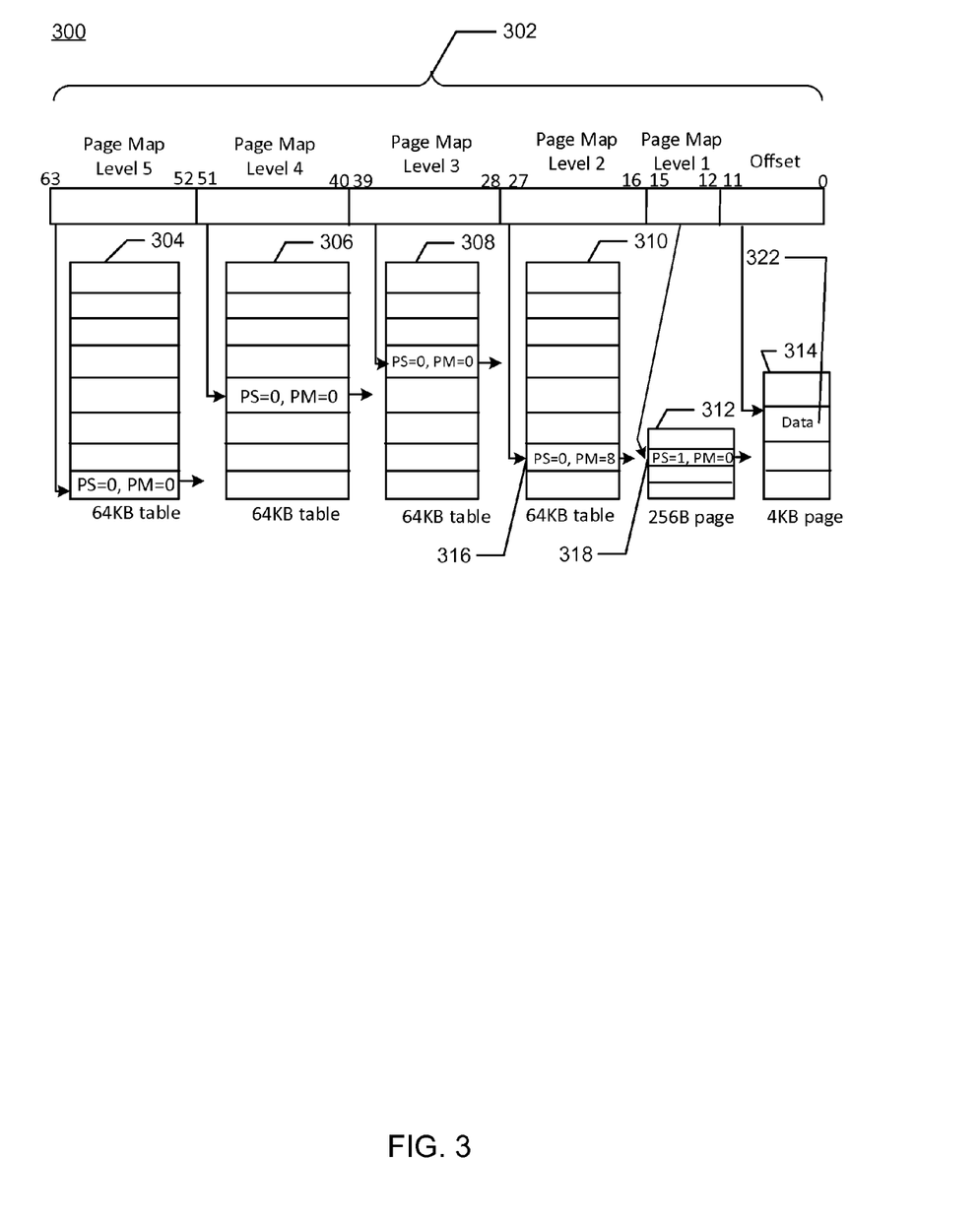
FIG. 3 depicts a multi-level page walk, according to an embodiment of the present invention.

FIG. 3 depicts a multi-level page table walk, according to embodiments of the present invention. Page table walk 300 results in a 4 KB page. Page table walk 300 has a 64-bit virtual address 302 to access 64 KB page tables 304-310, a 256B page table 312, and a 4 KB page 314. For page table entries of the first three levels, e.g., page table 304 (Page Map Level 5), page table 306 (Page Map Level 4), and page table 308 (Page Map Level 3), each page table entry has the same format as 230 in FIG. 2. The first three levels of page table walk 300 are to proceed as in the page table walk 200 of FIG. 2.

At the $4^{th}$ level (Page Map Level 2) the 4 KB page walk 300 is distinguished from the page walk 200 in FIG. 2 by page table entry 316 (in page table 310) that has PS=0 and PM=8. PS=0 means that the page walk does not stop at page map level 2. Instead, a physical address in page table entry 316 points to page table 312. PM=8 means that page table 312 maps (12−PM)=4 address bits and the page table is 64 KB/($2^{\wedge}$PM)=256B in size. The 64 KB page address in table entry 316 is not sufficient to select a 256B table. This problem could be solved in various ways. This embodiment uses the SubAddress field in bits (15:8) of the table entry 240 in FIG. 2. Inclusion of the subaddress bits with the physical address provides a 56-bit address that can select any aligned 256B block in a 64-bit address space.

At the fifth level, page table 312 is a 256B table with 16 entries, and therefore only 4 bits (15:12) of the virtual address 302 are needed to identify, in an entry 318 of page table 312, the physical address of page 314. Table entry 318 is marked as having PS=1 and PM=0, though this is not necessary since the page walk ends after five levels. The values of PS and PM are provided here for consistency with other page walk levels. Table entry 318 is to specify a 4 KB aligned physical address. The physical address field and the upper four bits of the Subaddress field provide this 4 KB aligned address. This physical address of 4 KB page 314 may be combined with bits 0-11 (e.g., offset) of the virtual address 302 to produce the physical address 322 of the requested data. The result is that each 4 KB page has a separate page table entry. Hence, each 4 KB page is to have an independent 4 KB physical page address, and corresponding values for the hardware bits, which ensures backward compatibility with 4 KB page systems.

Figure 4:
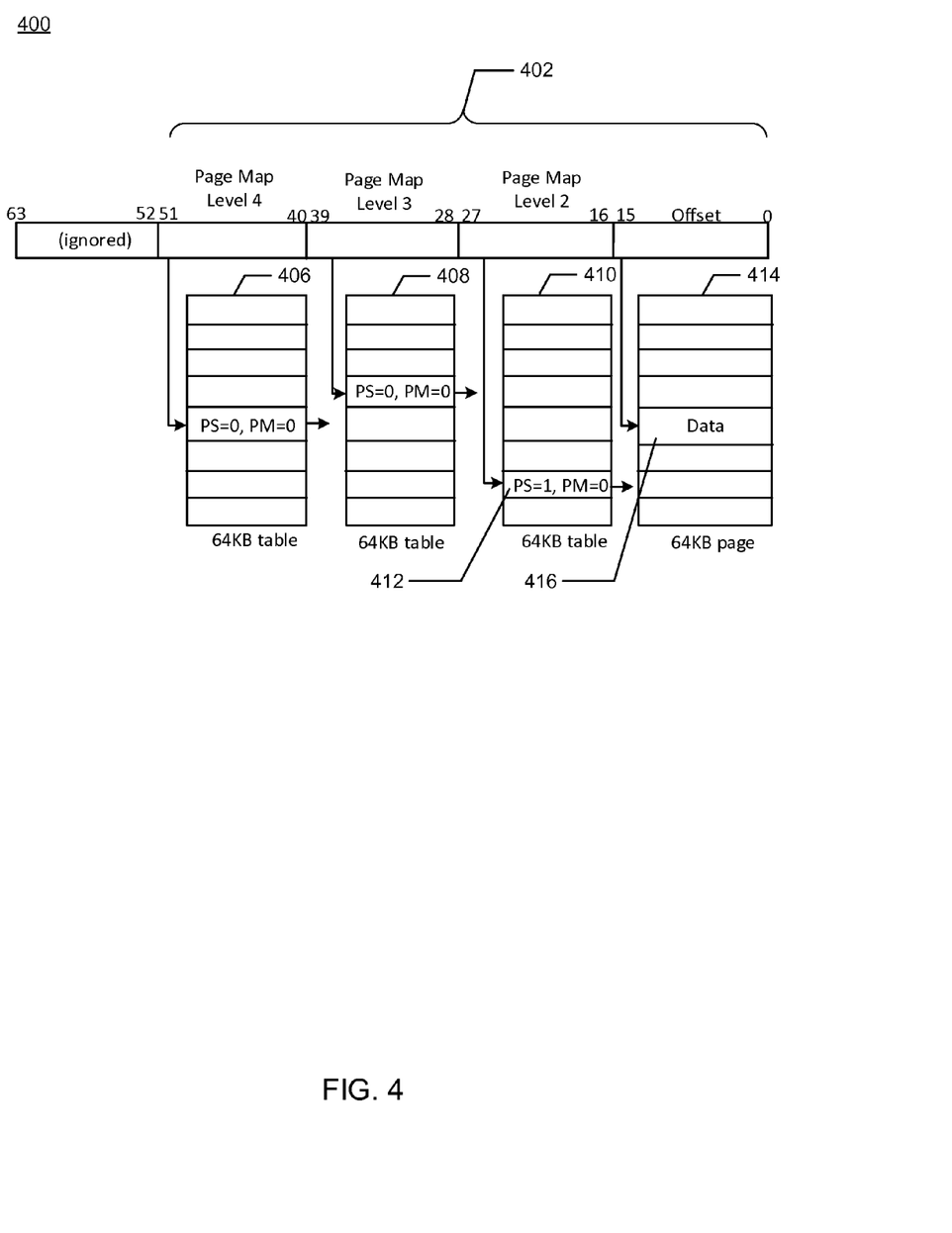
FIG. 4 depicts a multi-level page walk, according to an embodiment of the present invention.

FIG. 4 depicts a multi-level page table walk, according to an embodiment of the present invention. Multi-level page table walk 400 reduces the number of walks required by mapping a smaller virtual address space. Virtual address 402 utilizes three levels of page table lookup to map 52 virtual address bits, with bits (63:52) ignored. Each page table 406, 408, 410 has a size 64 KB and therefore has 4K entries, each entry having 128 bits. Page 414 has a size of 64 KB, and bits (15:0) of the virtual address 402 are used together with the physical address in 412 to select the data to access. The scheme depicted in page table walk 400 can be extended, e.g., to use two walks to support a 40-bit virtual address, and can also be used to support 4 KB pages, as described in reference to FIG. 2. The page table walk 400 can also be used to support large pages and self-mapping, as described below.

Figure 5:
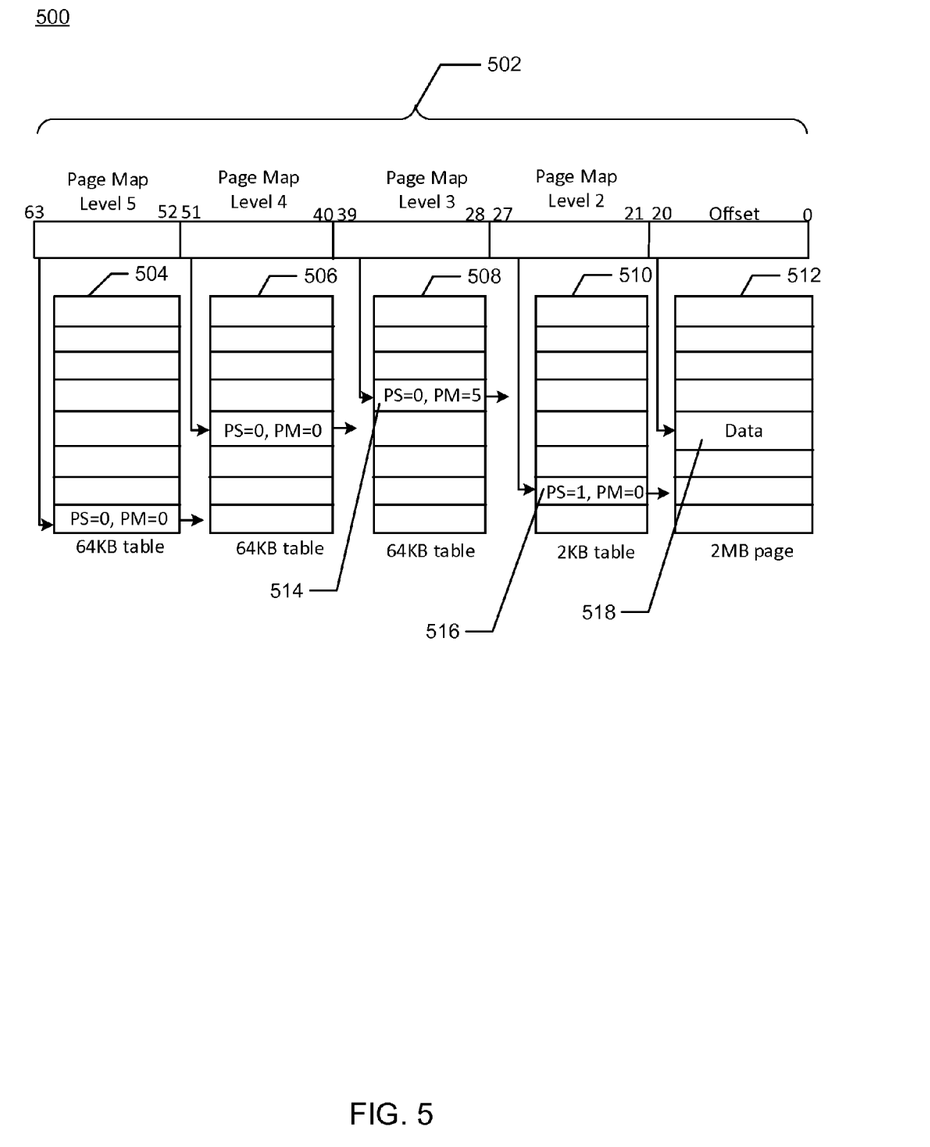
FIG. 5 depicts a multi-level page walk, according to an embodiment of the present invention.

FIG. 5 depicts a multi-level page table walk, according to an embodiment of the present invention, for use in a lookup of 2 MB pages. Page table walk 500 supports a large page size that is supported by Intel Architecture IA-32e. The example below is illustrative of a technique that can be used to produce other large page sizes, including other large page sizes supported by Intel Architecture IA-32e.

In page walk 500, virtual address 502 utilizes 64 bits to accomplish four levels of page table lookup. Each page table 504, 506, 508 has a size 64 KB and therefore has 4K entries, each entry having 128 bits. Entry 514 in page table 508 has PS=0 and PM=5. As a result, entry 514 contains the address of page table 510, which has a size of 64 KB/(2^PM)=2 KB and contains 128 table entries, and maps (12−PM)=7 virtual address bits. Therefore, bits (27:21) of the virtual address 502 are used to select entry 516 in page table 510. Since PS=1, the page walk ends at page table 510, and the physical address in entry 516 specifies 2 MB physical page 512. Offset bits (20:0) of the virtual address 502 determine the physical address of the requested data 518 within page 512.

Page walk scheme 500 can be used to support a variety of other page sizes. For example, if PS=1 and PM=0 at page map level 3, then the walk would end at page map level 3, leaving 28 bits of virtual address 502 unmapped. The result would result be a 256 MB page size. Note that the scheme 500 is not limited, and may be utilized to support other page sizes.

Figure 6:
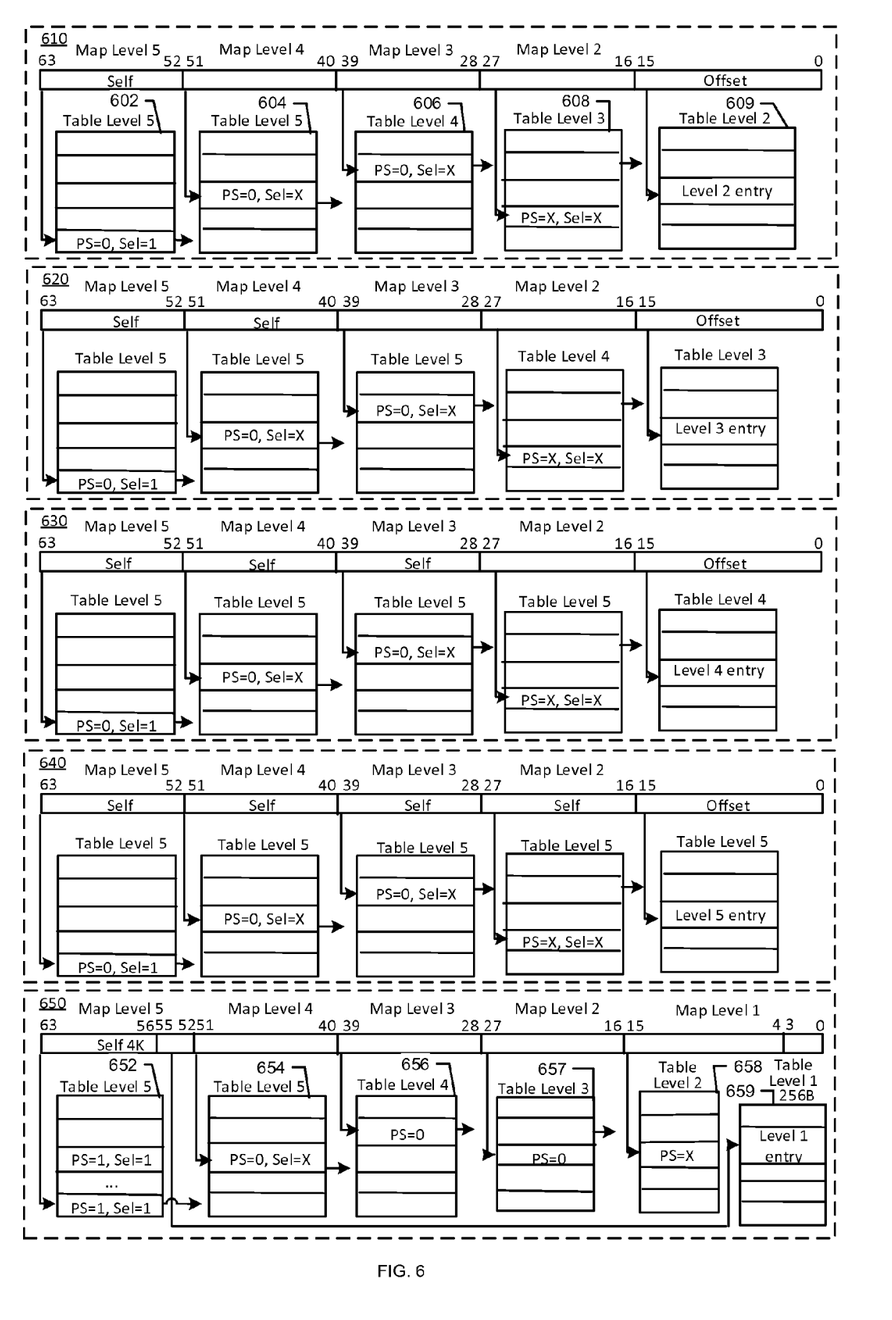
FIG. 6 depicts a multi-level page walk, according to an embodiment of the present invention.

FIG. 6 depicts five different multi-level page table walks that provide for self-mapping, according to embodiments of the present invention. Self-mapping enables an entirety of a page table tree to be mapped into virtual memory, which is used by some operating systems to modify the page table entries. For typical paging systems, self-mapping takes advantage of the normal hardware page walk mechanism by storing a table entry in the first level walk that contains the physical address of the same table. When the index of that dedicated page table entry is used in the high order virtual address bits, the result is a virtual address that causes self-mapping to occur. In current paging systems self-mapping uses the same page walk logic as is used for normal physical address mapping.

Self-mapping using this method requires a slightly different page walk that is used to map to a physical data address. The reason is described below. This alternate walk may be indicated via use of a self-mapping selection field of a first mapping level, e.g., bit 3 of the 128-bit entries, as shown in address portion 240 of FIG. 2. This bit may also be used for other purposes, as described below.

A self-mapping of a table level 2 is illustrated in 610. Map level 5 of the multi-level page walk 610 selects an address of the table level 5 602. When address bits (63:52) specify the dedicated self-mapping value, the result is that map level 4 accesses the same table level 5 again; that is, page table 604 is the same page table as page table 602. The only difference in usage is that at 602 the table is indexed by bits (63:52) of the virtual address and at 604 the table is indexed by bits (51:40) of the virtual address. As a result, page table 606, accessed at the map level 3, is at table level 4, and table 608, accessed at map level 2, is at table level 3. Then table 608 points to page table 609, which is at table level 2. But instead of accessing an entry in this table, data is accessed in table 609 using bits (15:0) of the virtual address. In other words, page table 609 is accessed as if it were a data page.

The above description matches how self-mapping works in typical paging systems. The difference in this method is that normal paging systems ignore the PS bit at what is described here as map level 2, since they do not support walking to a subsequent page table level that represents pages smaller than the size used for the page tables, as is illustrated for this method in FIG. 3. Therefore, a 64 KB page self-mapping walk may be defined that stops at map level 2 regardless of the value of PS at that level. This may be indicated in the entry accessed at Map Level 5 by setting PS=0 and Sel=1. The value of Sel at other map levels does not affect the page walk.

Self-mapping walks for the other page table levels are illustrated in 620, 630, and 640. As for self-mapping on current paging systems, the self-map address is repeated multiple times to end on the desired page table level. The 64 KB self-map walk mode described above works the same way for each of these cases. That is, it may be selected in all cases by setting PS=0 and Sel=1 at map level 5.

Accessing the 256B tables used to map 4 KB pages requires a different self-map mode. This may be selected by setting Sel=1 and PS=1 at map level 5. Normally PS=1 ends the page walk, but in the initial walk, with Sel=1, PS=1 may instead select a 4 KB page self-map walk, as illustrated in 650. This is a five-level walk that requires storing 16 aligned identical entries in the initial page table, each of which points back to the same page table. As a result, only bits (63:56) select the initial page table entry in page table 652, since the same entry value is read from the table for any value of address bits (55:52). After that initial level, the page walk continues in the normal way until map level 2 accesses table level 3 657. In 4 KB self-map mode, the entry selected at that level uses virtual address bits (15:4) to select an entry in table level 2 658. The entry selected in 658 specifies a 256B table level 1 659. The specify data addressed within 659 is selected by virtual address bits (3:0) appended to bits (55:52). This allows mapping all 256B of the table level 1.

The Sel bit defined for use in self-mapping modes above may be used in another way. Existing paging systems typically have only one meaning per bit in the page table entries. Exceptions to this rule are problematic because they typically depend on knowing the page walk level. As can be seen in the discussion of self-mapping, a given page table may not always be accessed at its expected level, so changing the meaning of bits based on the walk level makes it difficult to use self-mapping. Supporting 4 KB pages and the Intel Architecture IA-32e large page sizes only requires supporting one PM value per level. That is a possible implementation, but providing an explicit field avoids ambiguity when self-mapping.

Using a 128-bit entry allows a large number of addition hardware bits, e.g. approximately 32 more HW bits than the number that are defined for current paging systems. This permits encoding other capabilities into the page table entries. In most cases, these additional capabilities are only specified at the final walk levels. The Sel bit may be used to define two modal interpretations of some of the hardware bits at all walk levels except the initial walk, since Sel is used in the initial walk to select self-mapping walks. Such modal bits may not be specified at the initial walk level, since Sel is used for a different purpose at that level. Therefore, in the initial walk table, such modal bits are to be set to a disabled state. Using the Sel bit in this may significantly increase the number of hardware bits available in the page table entries. E.g., in one embodiment, bits (95:64) in page table entry field 234 in FIG. 2 could be used in this modal fashion, with bits (111:96) as non-modal hardware bits that are defined at all walk levels.

Figure 7:
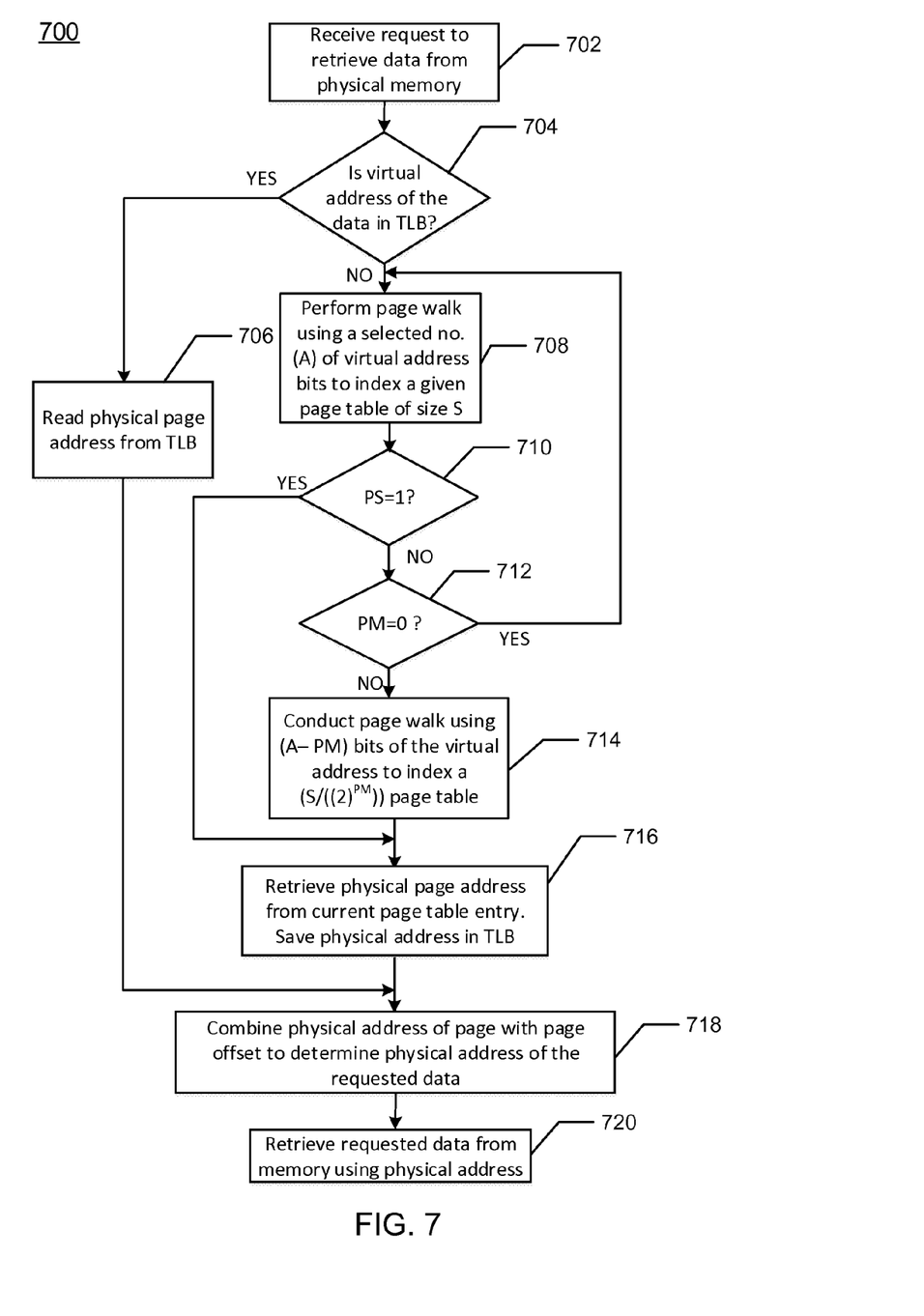
FIG. 7 is a flow diagram of a method, according to embodiments of the present invention.

FIG. 7 is a flow diagram of a method, according to embodiments of the present invention. Method 700 begins at block 702 with a request received to retrieve data from physical memory. Continuing to decision diamond 704, if the address matches a translation buffer entry (TLB), advancing to block 706 the physical page address is read directly from a translation lookaside buffer (TLB). If the virtual address of the data is not in the TLB, advancing to block 708 a page walk is performed that maps a selected number (A) of bits (e.g., 12 bits) of the virtual address to index a given page table of size S. For example, the selected number of bits may be 12 to index a 64 KB page table. Moving to decision diamond 710, if the page table entry indexed by the address bits has PS=1, then the page table entry contains the physical address of a page, and the method proceeds to block 716. If, at decision diamond 710 PS, ≠1 the method continues to decision diamond 712. At decision diamond 712, if the table entry has PM=0, the method continues back to block 708. If the table entry has PM≠0, then the method proceeds to block 714, so that the next page walk uses (A−PM) addresses bits to index a $[S/(2^{PM})]$ page table to produce a physical page address. In some embodiments, block 714 returns to decision diamond 710. In the embodiment described above PS=1 for the walk in block 714, so this block proceeds to block 716. At block 716, a physical page address is retrieved from a current page table entry. Optionally, the physical address can be saved in the TLB. Continuing to block 718, once the physical page address is found, low order virtual address bits are appended as the byte offset within the page to form a physical address of the requested data. Advancing to block 720, and a memory access is performed at the physical address of the requested data.

Figure 8:
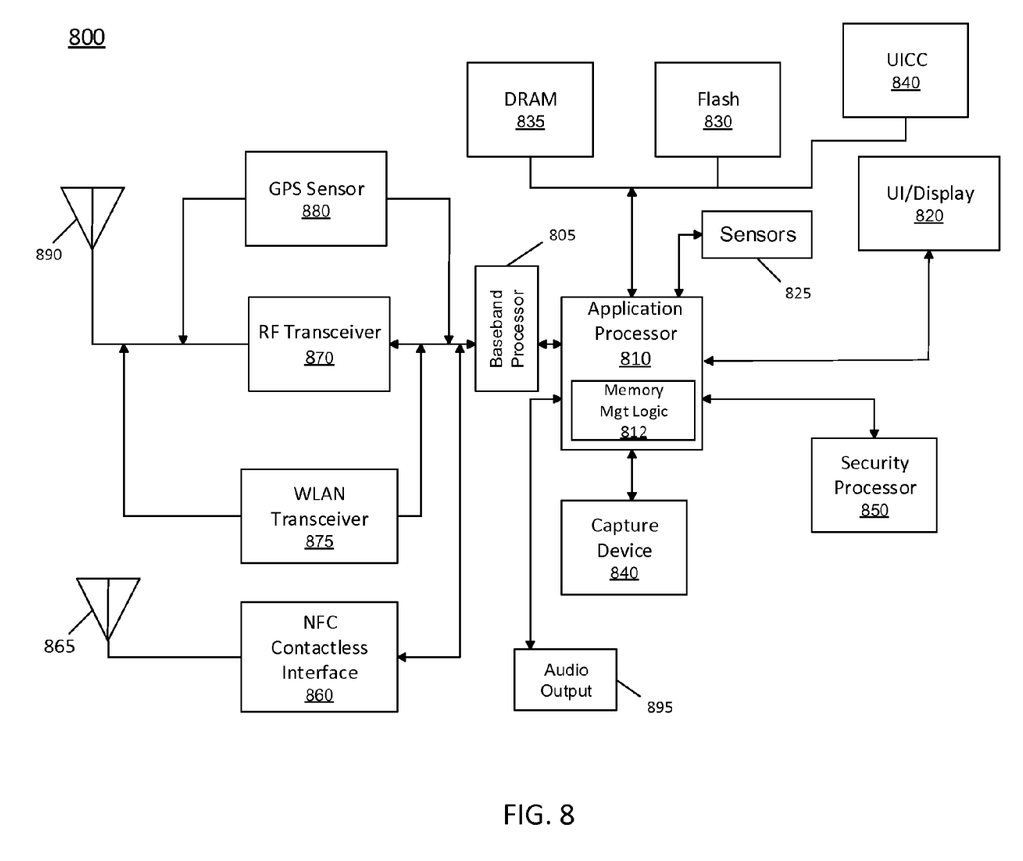
FIG. 8 is a block diagram of an example system with which embodiments can be used.

Referring now to FIG. 8, shown is a block diagram of an example system with which embodiments can be used. As seen, system 800 may be a smartphone or other wireless communicator. A baseband processor 805 is configured to perform various signal processing with regard to communication signals to be transmitted from or received by the system. In turn, baseband processor 805 is coupled to an application processor 810, which may be a main CPU of the system to execute an OS and other system software, in addition to user applications such as many well-known social media and multimedia applications. Application processor 810 may further be configured to perform a variety of other computing operations for the device. The application processor 810 can include memory management logic 812 perform a page walk scheme, based upon a page size, to access data stored in corresponding memory (e.g., DRAM 835), in accordance with embodiments of the present invention.

In turn, application processor 810 can couple to a user interface/display 820, e.g., a touch screen display. In addition, application processor 810 may couple to a memory system including a non-volatile memory, namely a flash memory 830 and a system memory, namely a dynamic random access memory (DRAM) 835. As further seen, application processor 810 further couples to a capture device 840 such as one or more image capture devices that can record video and/or still images.

Still referring to FIG. 8, a universal integrated circuit card (UICC) 840 comprising a subscriber identity module and possibly a secure storage and cryptoprocessor is also coupled to application processor 810. System 800 may further include a security processor 850 that may couple to application processor 810. A plurality of sensors 825 may couple to application processor 810 to enable input of a variety of sensed information such as accelerometer and other environmental information. An audio output device 895 may provide an interface to output sound, e.g., in the form of voice communications, played or streaming audio data and so forth.

As further illustrated, a near field communication (NFC) contactless interface 860 is provided that communicates in a NFC near field via an NFC antenna 865. While separate antennae are shown in FIG. 8, understand that in some implementations one antenna or a different set of antennae may be provided to enable various wireless functionality.

To enable communications to be transmitted and received, various circuitry may be coupled between baseband processor 805 and an antenna 890. Specifically, a radio frequency (RF) transceiver 870 and a wireless local area network (WLAN) transceiver 875 may be present. In general, RF transceiver 870 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 880 may be present. Other wireless communications such as receipt or transmission of radio signals, e.g., AM/FM and other signals may also be provided. In addition, via WLAN transceiver 875, local wireless communications can also be realized.

Figure 9:
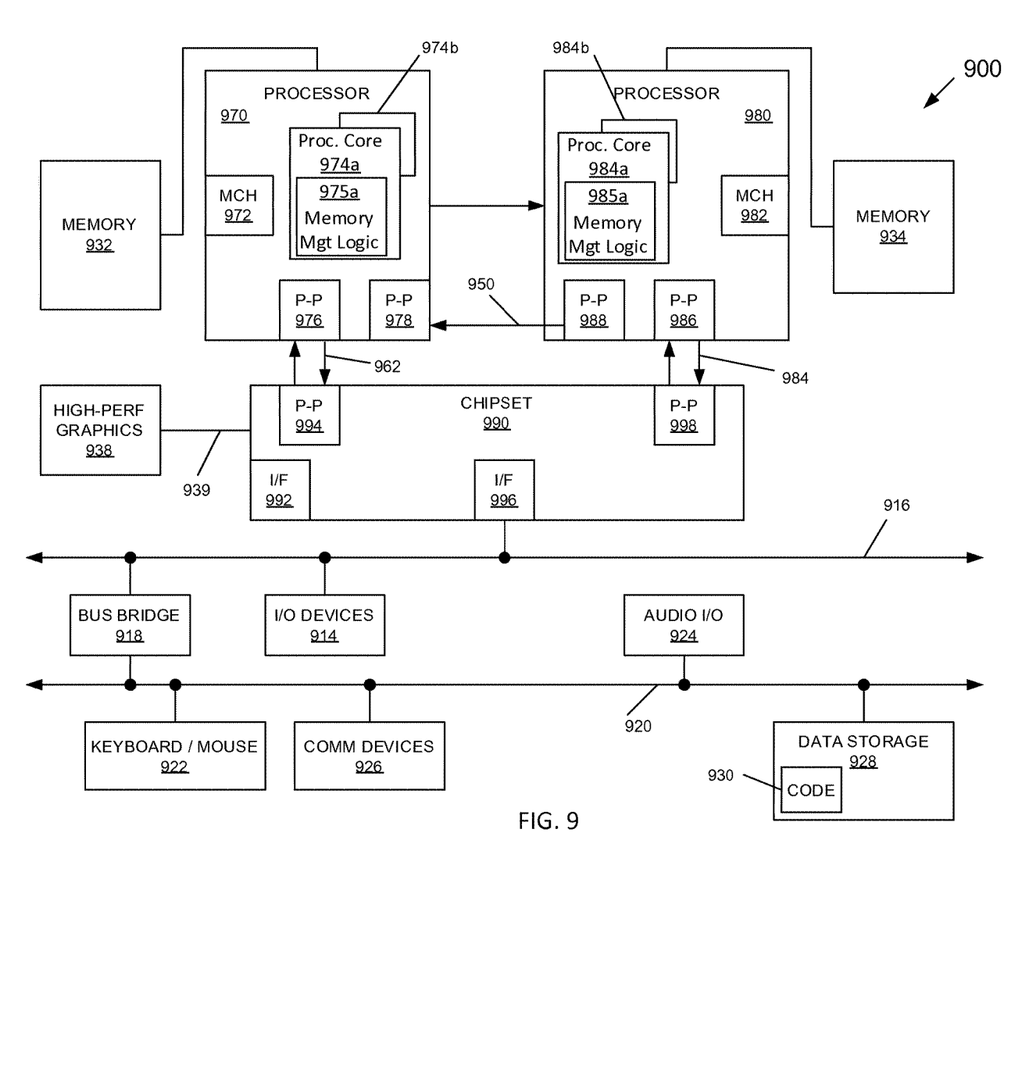
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 900 is a point-to-point interconnect system, and includes a first processor 970 and a second processor 980 coupled via a point-to-point interconnect 950. As shown in FIG. 9, each of processors 970 and 980 may be multicore processors, including first and second processor cores (i.e., processor cores 974a and 974b and processor cores 984a and 984b), although potentially many more cores may be present in the processors. In embodiments of the present invention, core 974a is to include memory management logic 975a, and core 984a is to include memory management logic 985a. One or both of memory management logic 984a or 985a is to perform a page walk scheme, based upon a page size, to access data stored in corresponding memory 932 or 934, in accordance with embodiments of the present invention.

Still referring to FIG. 9, first processor 970 further includes a memory controller hub (MCH) 972 and point-to-point (P-P) interfaces 976 and 978. Similarly, second processor 980 includes a MCH 982 and P-P interfaces 986 and 988. As shown in FIG. 9, MCHs 972 and 982 couple the processors to respective memories, namely a memory 932 and a memory 934, which may be portions of system memory (e.g., DRAM) locally attached to the respective processors. First processor 970 and second processor 980 may be coupled to a chipset 990 via P-P interconnects 962 and 984, respectively. As shown in FIG. 9, chipset 990 includes P-P interfaces 994 and 998.

Furthermore, chipset 990 includes an interface 992 to couple chipset 990 with a high performance graphics engine 938 via a P-P interconnect 939. In turn, chipset 990 may be coupled to a first bus 916 via an interface 996. As shown in FIG. 9, various input/output (I/O) devices 914 may be coupled to first bus 916, along with a bus bridge 918, which couples first bus 916 to a second bus 920. Various devices may be coupled to second bus 920 including, for example, a keyboard/mouse 922, communication devices 926 and a data storage unit 928 such as a disk drive or other mass storage device which may include code 930, in one embodiment. Further, an audio input/output (I/O) 924 may be coupled to second bus 920. Embodiments can be incorporated into other types of systems including mobile devices such as a smart cellular telephone, tablet computer, netbook, Ultrabook™, or so forth.

Additional embodiments are presented below.

In a first example, a processor includes logic to provide a first virtual address of first data stored in a memory at a first physical address, where the memory includes pages of a memory allocation unit page size. The processor also includes translation logic to access the first data via a first virtual to physical address translation that includes a first hierarchy of page translation tables to map to a first page having a first page size that is smaller than the memory allocation unit size.

A $2^{nd}$ embodiment includes elements of the $1^{st}$ example, where each page translation table is to include a plurality of page table (PT) entries, and where each PT entry includes a corresponding indicator to indicate when a page size of a page referenced by an address within the PT entry differs from the memory allocation unit size.

A $3^{rd}$ example includes elements of the $1^{st}$ example, where each page translation table is to include a plurality of page table (PT) entries, and where each PT entry of a first page translation table includes a corresponding indicator to specify a size of a next page translation page in the hierarchy of page translation pages.

A $4^{th}$ example includes elements of the $1^{st}$ example, where the memory allocation unit size is approximately 64 kilobytes and the first page size is approximately 4 kilobytes.

A $5^{th}$ example includes elements of the $1^{st}$ example, where the translation logic is further to map a 64-bit virtual address to a second page that has a second page size of approximately 64 kilobytes in a 64-bit page physical address space via a second virtual to physical address translation that includes a four stage hierarchy of page translation tables.

A $6^{th}$ example includes elements of the $5^{th}$ example, where each of the page translation tables includes approximately 4096 entries and each entry includes 128 bits.

A $7^{th}$ example includes elements of the $1^{st}$ example, where the translation logic is further to map a plurality of page translation tables into a virtual address space responsive to an indication to map to the virtual address space, the indication in an entry of a first page translation table of the plurality of page translation tables.

An $8^{th}$ example includes elements of any one of the $1^{st}$ to the $8^{th}$ examples, where the first hierarchy of page translation tables includes a plurality of page translation tables, where a count of the plurality of page translation tables corresponds to a size of the virtual address.

A $9^{th}$ example is a system that includes a memory that includes pages of a memory allocation unit size, and a processor that includes translation logic to receive a first virtual address of first data and to translate the first virtual address to a first physical address within a first page that has a first page size that is smaller than the memory allocation unit size, where translation is to occur via a first hierarchy of page translation tables.

A $10^{th}$ example includes elements of the $9^{th}$ example, where the first virtual address has a first virtual address size of 64 bits and where each page translation table is to be indexed by a corresponding portion of the first virtual address.

An $11^{th}$ example includes elements of the $9^{th}$ example, where the memory allocation unit size is approximately 64 kilobytes and the first page size is approximately 4 kilobytes.

A $12^{th}$ example includes elements of the $9^{th}$ example, where each page translation table includes a plurality of entries, and each entry of a first page translation table includes a corresponding indicator to specify a size of a next page translation table in the hierarchy of page translation pages.

A $13^{th}$ example includes elements of any one of the $9^{th}$ to the $12^{th}$ examples, where the processor is to receive a second virtual address of a second data and to translate the second virtual address to a second physical address within a second page that has a second page size that is larger than the memory allocation unit size, and where translation is to occur via a second hierarchy of page translation tables.

A $14^{th}$ example is a machine-readable medium having stored thereon data, which if used by at least one machine, causes the at least one machine to fabricate at least on integrated circuit to perform a method including receiving a first virtual address of first data stored in a memory at a first physical address, where the memory includes pages of a memory allocation unit page size, and accessing the first data via a first virtual to physical address translation that includes a first hierarchy of page translation tables to map to a first page having a first page size that is smaller than the memory allocation unit size.

A $15^{th}$ example includes elements of the $14^{th}$ example, where accessing the first data further includes performing a page walk of a particular page table (PT) of the first hierarchy of page translation tables, the page walk based on a portion of the first virtual address of the first data, to determine a corresponding page table entry (PTE) that identifies a next selection, where for each page walk the corresponding PTE is to include a corresponding PTE first indicator of whether the next selection is a next PT or the data page, and a corresponding PTE second indicator of a size of the next PT, performing a next page walk of the next PT to determine a next selection responsive to an indication in the PTE first indicator that the next selection is the next PT, and performing a lookup of the first data within the first data page based on the page table entry responsive to the first PTE first indicator that indicates that the next selection is the data page.

A 16$^{th}$ example includes elements of the 15$^{th}$ example, where each PTE has a size of 128 bits.

A 17$^{th}$ example includes elements of the 14$^{th}$ example, where the memory allocation unit size is approximately 64 kilobytes (KB) and the first page to be accessed has a first page size of approximately 4 KB.

An 18$^{th}$ example includes elements of the 14$^{th}$ example, where the method further includes mapping a 64-bit virtual address to a second page that has a second page size of approximately 64 kilobytes in a 64-bit page physical address space via a second virtual to physical address translation that includes a four stage hierarchy of page translation tables.

A 19$^{th}$ example includes elements of the 18$^{th}$ example, where each of the page translation tables includes approximately 4096 entries and each entry includes 128 bits.

A 20$^{th}$ example includes elements of any one of the 14$^{th}$ to the 19$^{th}$ examples, where the virtual address has a virtual address size of 64 bits.

A 21$^{st}$ example is a method that includes receiving a first virtual address of first data stored in a memory at a first physical address, where the memory includes pages of a memory allocation unit page size, and accessing the first data via a first virtual to physical address translation that includes a first hierarchy of page translation tables to map to a first page having a first page size that is smaller than the memory allocation unit size.

A 22$^{nd}$ example includes elements of the 21$^{st}$ example, where accessing the first data further includes performing a page walk of a particular page table (PT) of the first hierarchy of page translation tables, the page walk based on a portion of the first virtual address of the first data, to determine a corresponding page table entry (PTE) that identifies a next selection, where for each page walk the corresponding PTE is to include a corresponding PTE first indicator of whether the next selection is a next PT or the data page, and a corresponding PTE second indicator of a size of the next PT; performing a next page walk of the next PT to determine a next selection responsive to an indication in the PTE first indicator that the next selection is the next PT; and performing a lookup of the first data within the first data page based on the page table entry responsive to the first PTE first indicator that indicates that the next selection is the data page.

A 23$^{rd}$ example includes elements of the 22$^{nd}$ example, where each PTE has a size of 128 bits.

A 24$^{th}$ example includes elements of the 21$^{st}$ example, where the memory allocation unit size is approximately 64 kilobytes (KB) and the first page to be accessed has a first page size of approximately 4 KB.

A 25$^{th}$ example includes elements of the 21$^{st}$ example, where the method further includes mapping a 64-bit virtual address to a second page that has a second page size of approximately 64 kilobytes in a 64-bit page physical address space via a second virtual to physical address translation that includes a four stage hierarchy of page translation tables.

A 26$^{th}$ example includes elements of the 25$^{th}$ example, where each of the page translation tables includes approximately 4096 entries and each entry includes 128 bits.

A 27$^{th}$ example includes elements of the 21$^{st}$ example, where the virtual address has a virtual address size of 64 bits.

A 28$^{th}$ example is an apparatus that includes means for performing the method of any one of examples 21 to 27.

A 29$^{th}$ example is a system that includes memory means for storing data, where the memory means is to include pages of a memory allocation unit size, and a processor that includes translation means for receiving a first virtual address of first data and for translating the first virtual address to a first physical address within a first page that has a first page size that is smaller than the memory allocation unit size, where translation is to occur via a first hierarchy of page translation tables.

A 30$^{th}$ example includes elements of the 29$^{th}$ example, where the first virtual address has a first virtual address size of 64 bits and where each page translation table is to be indexed by a corresponding portion of the first virtual address.

A 31$^{st}$ example includes elements of the 29$^{th}$ example, where the memory allocation unit size is approximately 64 kilobytes and the first page size is approximately 4 kilobytes.

A 32$^{nd}$ example includes elements of the 29$^{th}$ example, where each page translation table includes a plurality of entries, and each entry of a first page translation table includes a corresponding indicator to specify a size of a next page translation table in the hierarchy of page translation pages.

A 33$^{rd}$ example includes elements of any one of the 29$^{th}$ to the 32$^{nd}$ example, where the processor is to receive a second virtual address of a second data and to translate the second virtual address to a second physical address within a second page that has a second page size that is larger than the memory allocation unit size, where translation is to occur via a second hierarchy of page translation tables.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions. While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
logic to provide a first virtual address of first data stored in a memory at a first physical address, wherein the memory includes pages of a memory allocation unit size; and
translation logic to access the first data via a first virtual to physical address translation that includes a first hierarchy of page translation tables to map to a first page having a first page size that is smaller than the memory allocation unit size, wherein each page translation table is to include a plurality of page table (PT) entries, wherein each PT entry of a first page translation table includes a corresponding indicator to specify a size of a next page translation table in the first hierarchy of page translation tables, the next page translation table size different than a size of the other page tables of the first hierarchy of page translation tables.

2. The processor of claim 1, wherein each PT entry includes a corresponding second indicator having a value to indicate that a page size of a page referenced by an address within the PT entry differs from the memory allocation unit size.

3. The processor of claim 1, wherein the memory allocation unit size is approximately 64 kilobytes and the first page size is approximately 4 kilobytes.

4. The processor of claim 1, wherein the translation logic is further to map a 64-bit virtual address to a second page that has a second page size of approximately 64 kilobytes in a 64-bit page physical address space via a second virtual to physical address translation that includes a four stage hierarchy of page translation tables.

5. The processor of claim 4, wherein each of the page translation tables includes approximately 4096 entries and each PT entry includes 128 bits.

6. The processor of claim 1, wherein the translation logic is further to map a plurality of page translation tables into a virtual address space responsive to an indication to map to the virtual address space, the indication in an entry of a first page translation table of the first hierarchy of page translation tables.

7. The processor of claim 1, wherein the first hierarchy of page translation tables includes a plurality of page translation tables, wherein a count of the plurality of page translation tables corresponds to a size of the virtual address.

8. A system comprising:
a memory that includes pages of a memory allocation unit size; and
a processor that includes translation logic to receive a first virtual address of first data and to translate the first virtual address to a first physical address within a first page that has a first page size that is smaller than the memory allocation unit size, wherein translation is to occur via a first hierarchy of page translation tables, wherein each page translation table of the first hierarchy of page translation tables is to include a plurality of page table (PT) entries, wherein each PT entry of a first page translation table includes a corresponding indicator to specify a size of a next page translation table in the first hierarchy of page translation tables, the next page translation table size different than a size of the other page tables of the first hierarchy of page translation tables.

9. The system of claim 8, wherein the first virtual address has a first virtual address size of 64 bits and wherein each page translation table is to be indexed by a corresponding portion of the first virtual address.

10. The system of claim 8, wherein the memory allocation unit size is approximately 64 kilobytes and the first page size is approximately 4 kilobytes.

11. The system of claim 8, wherein the processor is to receive a second virtual address of a second data and to translate the second virtual address to a second physical address within a second page that has a second page size that is larger than the memory allocation unit size, wherein translation is to occur via a second hierarchy of page translation tables.

12. A machine-readable medium having stored thereon data, which if used by at least one machine, causes the at least one machine to fabricate at least on integrated circuit to perform a method comprising:
receiving a first virtual address of first data stored in a memory at a first physical address, wherein the memory includes pages of a memory allocation unit page size; and
accessing the first data via a first virtual to physical address translation that includes a first hierarchy of page translation tables to map to a first page having a first page size that is smaller than the memory allocation unit page size, wherein each page translation table of the first hierarchy of page translation tables is to include a plurality of page table entries, wherein each PT entry of a first page translation table includes a corresponding indicator to specify a size of a next page translation table in the first hierarchy of page translation tables, the next page translation table size different than a size of the other page tables of the first hierarchy of page translation tables.

13. The machine-readable medium of claim 12, wherein accessing the first data further comprises:
performing a page walk of a particular page table (PT) of the first hierarchy of page translation tables, the page walk based on a portion of the first virtual address of the first data, to determine a corresponding page table entry (PTE) that identifies a next selection, wherein for each page walk the corresponding PTE is to include a corresponding PTE first indicator of whether the next selection is a next PT or a data page, and the corresponding indicator;
performing a next page walk of the next PT to determine a next selection responsive to an indication in the PTE first indicator that the next selection is the next PT; and
performing a lookup of the first data within the first page based on the page table entry responsive to the first PTE first indicator that indicates that the next selection is the first page.

14. The machine-readable medium of claim 13, wherein each PTE has a size of 128 bits.

15. The machine-readable medium of claim 12, wherein the memory allocation unit page size is approximately 64 kilobytes (KB) and the first page to be accessed has a first page size of approximately 4 KB.

16. The machine-readable medium of claim 12, wherein the method further comprises mapping a 64-bit virtual address to a second page that has a second page size of approximately 64 kilobytes in a 64-bit page physical address space via a second virtual to physical address translation that includes a four stage hierarchy of page translation tables.

17. The machine-readable medium of claim 16, wherein each of the page translation tables includes approximately 4096 entries and each entry includes 128 bits.

18. The machine-readable medium of claim 12, wherein the virtual address has a virtual address size of 64 bits.

\* \* \* \* \*